United States Patent
Spaggiari (10) Patent No.: US 12,428,103 B2
(45) Date of Patent: Sep. 30, 2025

(54) APPARATUS FOR THE ELECTRIC PROPULSION OF A VEHICLE, IN PARTICULAR OF A HUMAN-POWERED VEHICLE

(71) Applicant: BIKEE BIKE S.R.L., Rovereto (IT)

(72) Inventor: Matteo Spaggiari, Rovereto (IT)

(73) Assignee: BIKEE BIKE S.R.L., Rovereto (IT)

( * ) Notice: Subject to any disclaimer, the term of this patent is extended or adjusted under 35 U.S.C. 154(b) by 810 days.

(21) Appl. No.: 17/633,496

(22) PCT Filed: Aug. 5, 2020

(86) PCT No.: PCT/IB2020/057403
§ 371 (c)(1),
(2) Date: Feb. 7, 2022

(87) PCT Pub. No.: WO2021/028784
PCT Pub. Date: Feb. 18, 2021

(65) Prior Publication Data
US 2022/0289335 A1  Sep. 15, 2022

(30) Foreign Application Priority Data

Aug. 9, 2019  (IT) .................. 102019000014526

(51) Int. Cl.
*B62M 6/70* (2010.01)

(52) U.S. Cl.
CPC .................... *B62M 6/70* (2013.01)

(58) Field of Classification Search
CPC .......... B62M 6/55; B62M 6/70; B62M 11/02; B62M 11/14

(Continued)

(56) References Cited

FOREIGN PATENT DOCUMENTS

CN   101941505 A    1/2011
JP   2001206275 A * 7/2001

(Continued)

OTHER PUBLICATIONS

Fukuoka, , Jul. 31, 2001, Power-Assisted Bicycle , JP-2001206275-A, 4 Pages ( (Year: 2001).*

(Continued)

*Primary Examiner* — Valentin Neacsu
*Assistant Examiner* — Felicia L. Brittman-Alabi
(74) *Attorney, Agent, or Firm* — SHUTTLEWORTH & INGERSOLL, PLC; Timothy J. Klima (57) ABSTRACT

An apparatus for the electric propulsion of a vehicle, in particular of a human-powered vehicle, preferably in the form of a bicycle or the like, comprising a support body, electric propulsion means for the forwarding actuation of the vehicle, preferably in the form of an electric motor, in particular of the brushless type, having a corresponding rotatable shaft for outputting the power generated by the same electric actuation means, or motor, and means for outputting the power generated by the electric propulsion apparatus, in particular comprising means for engaging, or meshing, with said operative connection means of the transmission means of the vehicle, i.e., with an elongated and closed-loop member, or articulated link chain. Said means for transferring the power generated by said electric actuation means, or motor, to said means for outputting the power generated by the electric propulsion apparatus comprise a first and a second speed reducer stage.

24 Claims, 10 Drawing Sheets

(58) Field of Classification Search
USPC .................................................... 180/206.7
See application file for complete search history.

(56) References Cited

FOREIGN PATENT DOCUMENTS

| WO | 2015044695 A1 | 4/2015 | |
| WO | WO-2016045181 A1 * | 3/2016 | .............. B62M 6/50 |

OTHER PUBLICATIONS

International Search Report and Written Opinion dated Nov. 5, 2020 from counterpart International Patent Application No. PCT/IB2020/057403.

\* cited by examiner

APPARATUS FOR THE ELECTRIC PROPULSION OF A VEHICLE, IN PARTICULAR OF A HUMAN-POWERED VEHICLE

This application is the National Phase of International Application PCT/IB2020/057403 filed Aug. 5, 2020 which designated the U.S.

This application claims priority to Italian Patent Application No. 102019000014526 filed Aug. 9, 2019, which application is incorporated by reference herein.

FIELD OF APPLICATION OF THIS INVENTION

The present invention relates to an apparatus for the electric propulsion of a vehicle, in particular of a human-powered vehicle.

Said vehicle preferably being in the form of a bicycle or the like.

BACKGROUND

Electric motors for pedal-assisted bicycles are progressively spreading on the market, giving rise to constant innovation in the sector.

Until a few years ago, electric motors for electric bicycles were typically installed in the hub of the wheels, in order to exploit a space not otherwise used and because of the volume required for these motors.

Over the years these motors have begun to show their limits. In fact, typically being brushless motors with external rotor with magnets directly fixed to the wheel hub and without reduction stages, the motors absorbed a great deal of current to produce the necessary torque. Furthermore, the lack of torque prevents the electric bicycles from tackling steep climbs (e.g., above a 10% incline), a factor which may be acceptable for city use on flat roads, but represents an insurmountable problem for use in the mountains.

Subsequently, to overcome this problem, brushless motors were introduced in which the coupling with the wheel hub was no longer direct, but the motion was reduced through planetary stages. These planetary stages are placed laterally to the active part of the motor, in a coaxial manner. This expedient allows to reduce the dimensions and the overall size (and therefore the costs) with respect to the motors without reduction stages, thanks to the fact that the motors, being able to rotate at higher speeds (for example 1000-2000 rpm), will require a lower drive torque with the same power output and, consequently, current in the lower windings.

However, this configuration of the motor located on the hub with one or two planetary reduction stages entails disadvantages. The first disadvantage is that the overall volume of the planetary stages takes away precious space from the active part of the motor, that is, the one destined to produce energy (stator, rotor, winding). The second disadvantage is that the transmission, albeit reduced, can count on a single fixed reduction ratio, and therefore the motor is forced to operate within a wide range of the rotational speed (for example: from 0 to 2000 rpm) by deviating far, and for most of the time, from the regime which guarantees maximum efficiency.

The axial dimensions of the rear hub of a bicycle are limited (less than 150 mm in most cases). The solution of the motor with planetary stages is forced to divide this limited space between the pinion of the crowns, the planetary stages and the active part of the motor (stator, winding, rotor). It should also be considered that the planetary system used in this solution places a limit on the maximum reduction ratio obtainable due to the reduced overall dimensions, which is usually between 3:1 and 4:1 for each reduction stage.

These combined factors mean that this system, even if it is an improvement, is still unable to fully exploit the intrinsic potential of the electric motor. In fact, the electric motor tends to offer optimal weight/power, size/power ratios in a range from 2000 to 4000 rpm, which this system cannot achieve. In fact, considering that typically the rear wheel of an electric bicycle performs from 60 to 300 revolutions per minute at maximum speed, the required reduction ratios should be in the range of 6:1-66:1. Such ratios are difficult to obtain with one or more stages of planetary reduction, compatibly with the space constraints of the rear hub of the bicycle wheel and the transmitted torques required.

To overcome this barrier, more recently "bottom bracket" systems have appeared in which the electric motor is no longer installed on the wheel hub, but near the bottom bracket of the bicycle itself, thus transmitting the torque delivered, via toothed wheel gear pairs, belts or chain transmissions, to the chainblades on which the bicycle chain engages.

This configuration (called mid-drive or crank drive) offers the advantage of being able to rotate the motor at a number of revolutions closer to the optimal amount (2000-4000 revolutions per minute) and to count on a subsequent reduction/multiplication stage (that of the bicycle itself, consisting of one or more chainblades, transmission chain and one or more gear pinions integral with the rear wheel hub to which we will refer as 'secondary transmission') which allows to maintain the electric motor in the rotation range close to maximum efficiency.

These advantages translate into smaller motors, lower current consumption and therefore greater autonomy with the same battery pack.

However, the crank drive configuration has some disadvantages: the increased complexity, and therefore increased production costs, compared to motors positioned on the hub, as well as the dimensions and weight required by the primary transmission system (which transmits the motion from the electric motor to the bottom bracket of the bike).

The typical configuration of mid-drive systems is characterized by an electric motor, a series of stages for an overall reduction ratio of 1:20-1:40 which carry the motion to a hub which, through one or two free wheels, collects the human power and that of the electric motor to transmit them to the front crown of the bicycle, which constitutes the drive for the secondary transmission. The secondary transmission of a bicycle typically works in multiples: starting from a crown which typically has from 32 to 44 teeth, it carries the motion to the rear wheel hub on which a pack with one or more pinions of various sizes is housed, in a typical range from 11 to 32 teeth.

This configuration involves a paradox: the motion coming from the electric motor is first reduced to reach the crown with a rotational speed compatible with human pedalling (0-120 rpm), and is subsequently multiplied, together with the muscle power, in the secondary transmission.

This paradox is incompatible with the trend of reducing weights, sizes and costs of electric motors for pedal-assisted vehicles.

To solve this problem it has been proposed that the motion output assisted by the electric motor act independently on the chain by means of a pinion distinct from the crown on which the muscular propulsion acts. This system allows to act on the chain using different reduction ratios between electric propulsion (which must not be multiplied) and muscle propulsion which, on the contrary, needs a multiplication stage.

However, this system has a single internal reduction stage, which however still involves large dimensions, weights and costs.

SUMMARY OF THE INVENTION

With the present invention it is wished to propose a new solution and/or an alternative to the solutions known up to now and in particular it is proposed to overcome one or more of the drawbacks or problems referred to above, and/or to satisfy one or more requirements referred to above and/or in any case experienced in the art, and in particular that can be deduced from the above.

An apparatus for the electric propulsion of a vehicle is therefore proposed, in particular a human-powered vehicle, preferably in the form of a bicycle or the like, comprising a support body, electric propulsion means for the forwarding actuation of the vehicle, preferably in the form of an electric motor, in particular of the brushless type, having a corresponding rotatable shaft for outputting the power generated by the same electric actuation means, or motor, means for outputting the power generated by the electric propulsion apparatus, said means for outputting the power generated by the electric propulsion apparatus, preferably being in the form of a corresponding small wheel, in particular toothed, especially which means for outputting the power generated by the electric propulsion apparatus in use are provided not coaxial to the wheel transmission means, in particular a toothed wheel, of said human-powered means for the forwarding actuation, and means for transferring the power generated by said electric actuation means, or motor, to said means for outputting the power generated by the electric propulsion apparatus, characterized in that said means for transferring the power generated by said electric actuation means, or motor, to said means for outputting the power generated by the electric propulsion apparatus comprise a first and a second speed reducer stage.

In this way, it is possible to use components for said means for transferring the power generated by said electrical actuation means to said means for outputting the power generated by the propulsion apparatus, i.e., corresponding small transmission wheels, which can be of not excessively large size or diameter and it is thus possible to reduce the corresponding length of the propulsion apparatus and consequently the corresponding dimension of the support body with an overall reduction of the weight of the same apparatus. Furthermore, it is possible to achieve powers output from the same transferring means which are suitably high, even with motors with lower drive torque, with a further advantage for the weight of the propulsion apparatus.

BRIEF DESCRIPTION OF THE DRAWINGS

This and other innovative aspects are, however, set forth in the appended claims, the technical characteristics of which can be found, together with corresponding advantages achieved, in the following detailed description, illustrating a purely non-limiting example of the embodiment of the invention, which is made with reference to the appended drawings, in which:

DETAILED DESCRIPTION OF PREFERRED EMBODIMENTS OF THE INVENTION

The attached figures show a preferred embodiment 10 of the electric propulsion apparatus of a vehicle 11, in particular of a human-powered vehicle 11, preferably in the form of a bicycle or the like.

Figure 1A:
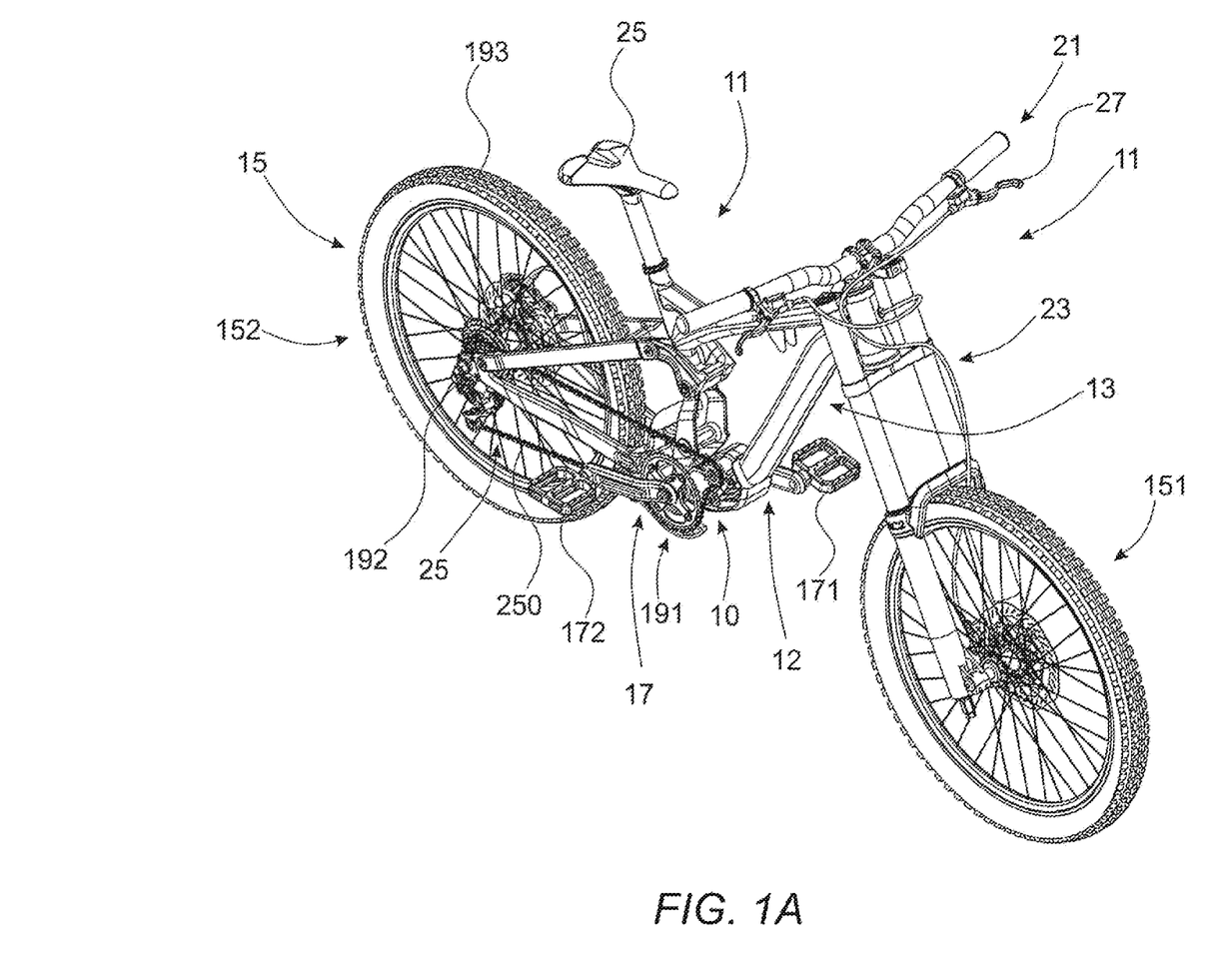
FIG. 1A shows a schematic perspective view of a preferred embodiment of a bicycle with the apparatus according to the present invention mounted.
Figure 1B:
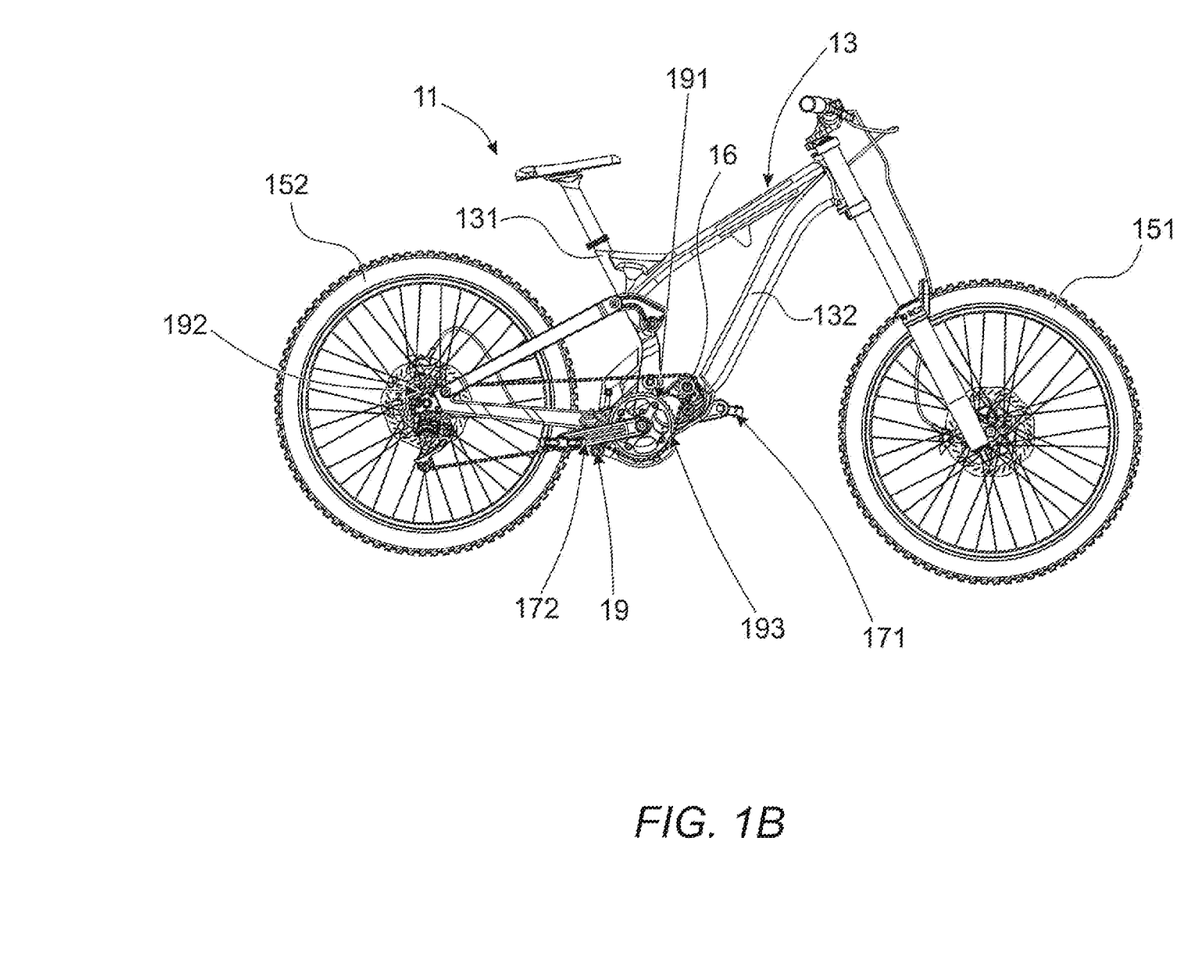
FIG. 1B shows a schematic, raised side view of a preferred embodiment of a bicycle with the apparatus according to the present invention mounted.

As can be seen in FIGS. 1A and 1B, said vehicle, or bicycle, 11 generally comprises a support frame 13, corresponding support means 15 below the vehicle, in particular for resting on the ground, in particular in the form of wheel means, preferably having at least a first and a second wheel 151, 152, respectively front and rear, in particular longitudinally aligned with each other.

However, it must be understood that the present apparatus could also be used on a vehicle having a number of ground support wheels which is greater than the two wheels illustrated here with reference to the present preferred embodiment of the vehicle. Said vehicle may for example be in the form of a three-wheeled vehicle, or tricycle.

As can be seen in FIGS. 1A and 1B, said vehicle, or bicycle, 11 also comprises human-powered means 17 for the forwarding actuation of the vehicle, in particular comprising corresponding pedal means, preferably in the form of a first and a second pedal 171, 172, and especially provided at the opposite sides of said support frame 13, and means 19 for transmitting the human-powered actuation, in particular with wheel forwarding means, especially defined by said rear wheel 152, and preferably comprising respective wheel transmission means, in particular toothed wheel, 191, at said means, or pedals, 15 for forwarding the human-powered vehicle.

In particular, said human-powered means 17 for the forwarding actuation of the vehicle, i.e., the corresponding wheel transmission means 19, in particular a toothed wheel, 191, having a respective pivot axis, in particular transverse to the vehicle frame.

As can be seen in FIGS. 1A and 1B, said vehicle, or bicycle, 11 also comprises wheel transmission means, in particular a toothed wheel, 192 at said wheel forwarding means, in particular at said rear wheel 152, and corresponding operative connection means 193, in particular in the form of an elongated and closed-loop member, preferably in the form of an articulated link chain 193, which operatively connects said wheel transmission means, in particular a toothed wheel, 191, at said means, or pedals, 15 for forwarding the human-powered vehicle and said wheel transmission means, in particular a toothed wheel, 192 at said wheel forwarding means, in particular at said rear wheel 152.

As shown, the vehicle has in particular a plurality of toothed wheels 192, which can be selected through corresponding control means, at said wheel forwarding means, in particular at said rear wheel 152.

The vehicle, or bicycle, further comprises steering means, in particular in the form of a respective rotatable handlebar 21, preferably supported in front of said support frame 13 and operating on a corresponding yoke 23 supporting said front wheel 151, a saddle 25 for the user of the vehicle, control means, in particular of the transmission ratio change, vehicle braking means and other.

As can be seen from the figure, the electric propulsion apparatus 10 therefore comprises a support body 12, electrical propulsion means 14 for forwarding the vehicle, preferably in the form of an electric motor, in particular of the brushless type.

Said electric motor comprises a stator 141, especially having a respective winding 141*a* adapted to produce the electromagnetic actuation field in rotation for a corresponding rotor 142, in particular of the type with permanent magnets 142*m*, peripherally distributed along the rotor body 142, and having a corresponding rotatable shaft 140 for outputting the power generated by the same electric actuation means, or motor, 14.

Preferably, as shown, said rotatable shaft 140 of the same electric actuation means, or motor, 14 has a respective axis extending, in use, transversely to the longitudinal direction of the vehicle.

As can be seen from the figures, the electric propulsion apparatus 10 also comprises means 16 for outputting the power generated by the electric propulsion apparatus 10, in particular comprising means 16 for engaging, or meshing, with said operative connection means 193 of the vehicle transmission means 19, or with said elongated and closed-loop member, or articulated link chain 193.

Said means 16 for outputting the power generated by the electric propulsion apparatus 10 are preferably in the form of a corresponding small wheel, in particular toothed, 16.

Furthermore, as can be seen in the figures, said means 16 for outputting the power generated by the electric propulsion apparatus 10, in use, are provided not coaxial to the wheel transmission means, in particular a toothed wheel, 191 with said human-powered forwarding means.

Further, even more so, said means 16 for outputting the power generated by the electric propulsion apparatus 10, in use, are provided not coaxial to said wheel transmission means, in particular a toothed wheel 192, at said wheel forwarding means.

As can be seen in the figures, the electric propulsion apparatus 10 also comprises means for transferring the power generated by said electric actuation means, or motor, 14 to said means 16 for outputting the power generated by the electric propulsion apparatus 10.

Advantageously, according to the invention, said means for transferring the power generated by said electric actuation means, or motor, 14 to said means 16 for outputting the power generated by the electric propulsion apparatus 10 comprise a first 18*a* and a second 18*b* speed reducer stage.

In this way, it is possible to use components for said means for transferring the power generated by said electrical actuation means to said means for outputting the power generated by the propulsion apparatus, i.e., corresponding small transmission wheels, which can be of not excessively large size or diameter and it is thus possible to reduce the corresponding length of the propulsion apparatus and consequently the corresponding dimension of the support body with an overall reduction of the weight of the same apparatus. Furthermore, it is possible to achieve powers output from the same transferring means which are suitably high, even with motors with lower drive torque, with a further advantage for the weight of the propulsion apparatus.

Advantageously, as can be seen in the figures, said means, or small wheel, 16 for outputting the power generated by the electric propulsion apparatus 10 are supported by a corresponding transversal rotatable shaft 160 supported by said support body 12 of the apparatus 10.

Advantageously, as can be seen in the figures, said means, or small wheel, 16 for outputting the power generated by the electric propulsion apparatus 10 are actuated, in rotation, by a corresponding small actuation wheel 168, in particular toothed, in particular coaxially supported, or mounted, at the opposite end of said transversal shaft 160 supporting the same means, or pinion, 16 for outputting the power generated by the electric propulsion apparatus 10.

Advantageously, as can be seen in the figures, said small wheel 168 for actuating said means, or small wheel, 16 for outputting the power generated by the electric propulsion apparatus 10, i.e., the end of said transversal shaft 160 for supporting the same means, or small wheel, 16 for outputting the power generated by the electric propulsion apparatus 10, in which the same small actuation wheel 168 is located, is at an intermediate transversal zone of said apparatus 10, i.e., of the respective support body 12.

Advantageously, as can be seen in the figures, said transversal shaft 160 for supporting said means, or wheel, 16 for outputting the power generated by the electric propulsion apparatus 10 is arranged longitudinally aligned with said electric actuation means, or motor, 14.

Advantageously, as can be seen in the figures, said electric actuation means, or motor, 14 comprise a respective small actuation wheel, in particular toothed, 148 supported, or mounted, coaxially on the respective rotatable shaft 140 of the same actuation means, or motor, 14.

Advantageously, as can be seen from the figures, said means 18 for transferring the power generated by said electric actuation means 14 to said means 16 for outputting the power generated by the electric propulsion apparatus 10 comprise a respective small wheel, in particular toothed, 181 actuated by said electric actuation means, or motor, 14, and in particular engaging or meshing with said small actuation wheel, in particular toothed, 148 mounted on the respective rotatable shaft 140 of the same actuation means, or motor 14.

Advantageously, as can be seen in the figures, said small wheel 181, of said means 18 for transferring the power generated by said electric actuation means 14 to said means 16 for outputting the power generated by the electric propulsion apparatus 10, and said small actuation wheel 148, mounted on the respective rotatable shaft 140 of the same actuation means, or motor, 14, define together said first speed reducer stage 18*a* of the electric propulsion apparatus 10.

Advantageously, as can be seen in the figures, said small wheel, in particular toothed, 181 actuated by said electric actuation means, or motor, 14, and in particular engaging, or meshing, said small actuation wheel, in particular toothed, 148 mounted on the respective rotatable shaft 140 of the same actuation means, or motor 14, is arranged longitudinally aligned with said rotatable shaft 140 of the same electric actuation means, or motor 14, protruding from the same electric actuation means, or motor, 14.

Advantageously, as can be seen in the figures, said means 18 for transferring the power generated by said electric actuation means 14 to said means 16 for outputting the power generated by the electric propulsion apparatus 10 comprise a respective small wheel, in particular toothed 182 for the actuation of the same means, or pinion, 16 for outputting the power generated by the electric propulsion apparatus 10, in particular which small actuation wheel 182 engages, or meshes, said small wheel, in particular toothed, 168 for actuating said means, or pinion, 16 for outputting the power generated by the electric propulsion apparatus 10, especially provided on said transversal shaft 160 for supporting said means, or pinion, 16 for outputting the power generated by the electric propulsion apparatus 10.

Advantageously, as can be seen in the figures, said small wheel, in particular toothed, 181 actuated by said electric actuation means, or motor, 14 is operatively connected with said small wheel 182 for the actuation of the same means, or pinion, 16 for outputting the power generated by the electric propulsion apparatus 10, in particular being integral in rotation, i.e., being mounted on the same transversal shaft 180 supporting this small wheel, in particular toothed, 182 for the actuation of the same means, or pinion, 16 for outputting the power generated by the electric propulsion apparatus 10.

Advantageously, as can be seen in the figures, said small wheel 182, for actuating the same means, or pinion, 16 for outputting the power generated by the electric propulsion apparatus 10, and said small actuation wheel 168, of said means, or pinion, 16 for outputting the power generated by the electric propulsion apparatus 10, together define said second speed reducer stage 18*b* of the electric propulsion apparatus 10.

Advantageously, as can be seen in the figures, said transversal shaft 180 of said means 18 for transferring the power generated by said electric actuation means 14 to said means 16 for outputting the power generated by the electric propulsion apparatus 10 is longitudinally arranged between said transversal rotatable shaft 140 of the same electric actuation means, or motor, 14 and said transversal rotatable shaft 160 of said means, or pinion, 16 for outputting the power generated by the electric propulsion apparatus 10.

Advantageously, as can be seen in the figures, said intermediate transversal shaft 180, of said means 18 for transferring the power generated by said electric actuation means 14 to said means 16 for outputting the power generated by the electric propulsion apparatus 10, is arranged parallel to said transversal rotatable shaft 160 of said means, or pinion, 16 for outputting the power generated by the electric propulsion apparatus 10 and/or to said transversal rotatable shaft 140 of the same electric actuation means, or motor, 14.

Advantageously, as can be seen in the figures, said transversal shaft 180, i.e., the respective axis, supporting this said small wheel, in particular toothed, 182 for the actuation of the same means, or pinion, 16 for outputting the power generated by the electric propulsion apparatus 10 is perpendicularly arranged at a height level that is lower than said transversal rotatable shaft, i.e., the respective axis, 160 of said means, or pinion, 16 for outputting the power generated by the electric propulsion apparatus 10 and/or of said transversal rotatable shaft, i.e., the respective axis, 140 of the same electric actuation means, or motor, 14.

Advantageously, as can be seen in the figures, said transversal rotatable shaft, or the respective axis, 160 of said means, or pinion, 16 for outputting the power generated by the electric propulsion apparatus 10 is perpendicularly arranged at a height lower than that of said transversal rotatable shaft, or the respective axis, 140 of the same electric actuation means, or motor, 14.

With particular advantage, as can be seen in the figures, said small wheel, in particular toothed, 182 for operating the same means, or pinion 16 for outputting the power generated by the electric propulsion apparatus 10, is arranged longitudinally aligned with said electric actuation means, or motor, 14.

Advantageously, as can be seen in the figures, freewheel means 30 are provided which allow the electric propulsion apparatus 10 to transmit power only to make the vehicle 11 move forward.

Advantageously, as can be seen in the figures, said freewheel means 30 which allow the electric propulsion apparatus 10 to operate in a mono-directional forwarding actuation mode of the vehicle are provided between a corresponding transversal shaft and the respective wheel supported thereon, in particular between said transversal rotatable shaft 180, of said means 18 for transferring the power generated by said electrical actuation means 14, and said wheel, in particular toothed, 182 for actuating said means, or pinion, 16 for outputting the power generated by the electric propulsion system 10.

Advantageously, as can be seen in the figures, means 24 are provided which are adapted to engage and to keep said vehicle transmission means tensioned, i.e., said elongated and closed-loop member, or articulated link chain 193 of the vehicle 11.

Advantageously, as can be seen in the figures, said means 24 which are adapted to engage and to keep said vehicle transmission means tensioned, i.e., with the connecting articulated link chain 193, comprise a respective small wheel, in particular toothed, 240 for the engagement, or meshing, with said operative connection means 193 of the vehicle transmission means 19, i.e., with said elongated and closed-loop member, or articulated link chain, 193 of the vehicle 11.

Advantageously said means, or small wheel, 24 which are adapted to engage and to keep said vehicle transmission means tensioned, i.e., said elongated and closed-loop member, or articulated link chain, 193 of the vehicle 11, are carried freely rotating by a corresponding support arm 241, in particular at a free end 241*a* thereof, which said support arm 241 is rotatably supported, or pivoted, to the same support body 12, preferably at the end 241*b* opposite that for supporting the same means, or small wheel, 24 which are adapted to engage and to keep said vehicle transmission means tensioned.

Advantageously, as can be seen in the figures, said support arm 241 of said means, or small wheel, 24 which are adapted to engage and to keep said vehicle transmission means tensioned, or said elongated closed-loop member, or articulated link chain, 193 of the vehicle 11, is connected to, and supported by, said support body 12, through a corresponding supporting shaft 242, which is rotatably supported on said support body 12, in particular, as will be better understood from the following of the present description, from the second shell-like member 122 of said support body 12 of the apparatus 10, to which said support arm 241 is integral at the free end thereof which protrudes from the same support body 12.

Advantageously, as can be seen in the figures, elastic means 243 are provided which are adapted to push said means, or small wheel, 24 which are adapted to engage and to keep said vehicle transmission means tensioned, against the same vehicle transmission means, or against said elongated and closed-loop member, or articulated link chain, 193 of the vehicle 11.

Advantageously, as can be seen in the figures, said elastic means 243 which are adapted to push said means, or small wheel 24, which are adapted to engage and to keep said vehicle transmission means tensioned, against the same vehicle transmission means, i.e., against said elongated and closed-loop member, or articulated link chain 193 of the vehicle 11, act on, in particular are wound about, said small rotatable supporting shaft 242 of the same means, or small wheel 24 which are adapted to engage and to keep said vehicle transmission means tensioned, i.e., said elongated and closed-loop member, or articulated link chain 193 of the vehicle 11. In particular, said elastic means are in the form of a respective torsion spring, preferably helical in shape, 243, which has a respective end integral with said supporting shaft 242 and the other end with said support body 12.

Advantageously, as can be seen in the figures, means 26 are provided for detecting the intensity of the propulsion which is imparted by the user to the corresponding means, or pedals, 15 for forwarding the human-powered vehicle.

Advantageously, as can be seen in the figures, said means 26 for detecting the intensity of the propulsion that is imparted by the user to the corresponding forwarding means, or pedals, 15 of the human-powered vehicle comprise corresponding means 261 for detecting the angular position of said small rotatable shaft 242 for supporting said support arm 241 of said means 24 that are adapted to engage and to keep said vehicle transmission means tensioned.

Advantageously, as can be seen in the figures, said means 261 for detecting the angular position of said support arm 241 are in the form of a Hall effect sensor 261', which detects the position of a corresponding permanent magnet 261" secured to said small rotatable shaft 242 for supporting said support arm 241 of said means 24 that are adapted to engage and to keep said vehicle transmission means tensioned 11.

In this way, it is possible to obtain a particularly immediate measurement of the muscular effort that is made by the user of the vehicle.

Advantageously, as can be seen in the figures, control means 28 are provided for said electric propulsion apparatus 10, in particular for said electric actuation means, or motor, 14, especially in the form of corresponding electronic processing means operating as the control of a corresponding software.

Advantageously, as can be seen in the figures, said control means 28 of said electric propulsion apparatus 10, in particular of said electric actuation means, or motor, 14 are supported on a corresponding electronic board 28, in particular having corresponding microprocessor means and corresponding input and output means.

Advantageously, as can be seen in the figures, said means, or board, 28 for controlling said electric propulsion apparatus 10, in particular said electric actuation means, or motor, 14 are housed inside said support body 12, in particular by placing the electric propulsion apparatus 10 between said first and second speed reducer stages 18a, 18b.

Advantageously, as can be seen in the figures, said means 261 for detecting the angular position of said support arm 241, or the respective Hall effect sensor 261', are supported on a corresponding control board, in particular on said control means, or board 28 of said electric propulsion apparatus 10, in particular said electric actuation means, or motor, 14 of the same apparatus 10, in particular by arranging the same sensor 261 near the rear end of said rotatable supporting shaft 242 of said support arm 241 of the means 24 which are adapted to engage and to keep said vehicle transmission means tensioned.

Figure 2A:
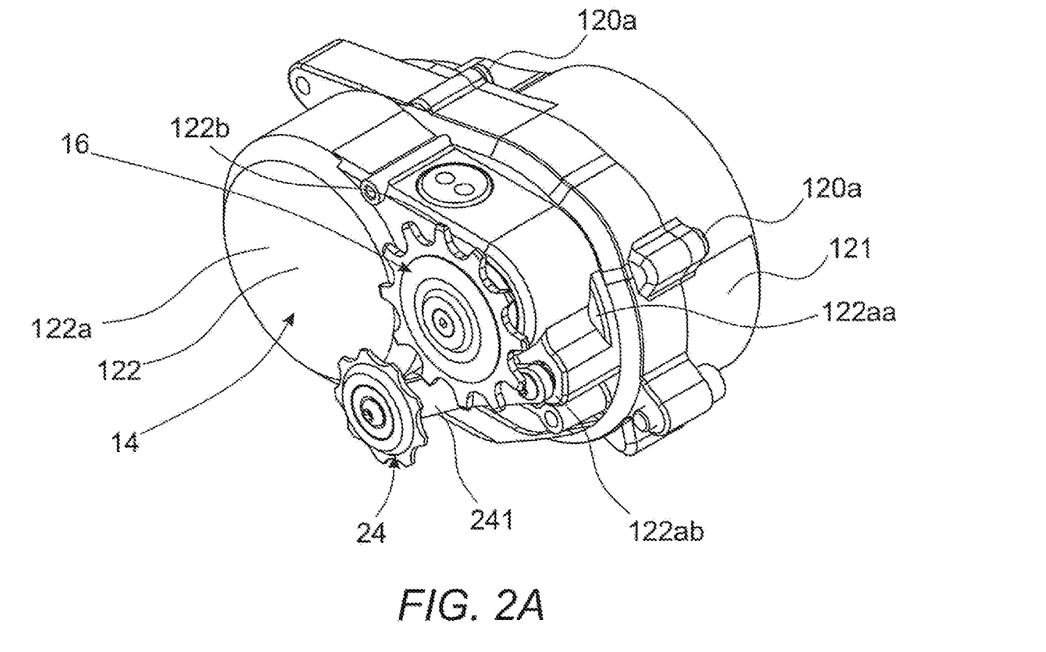
FIG. 2A shows a schematic perspective view taken from above of the preferred embodiment of the apparatus according to the present invention.
Figure 2B:
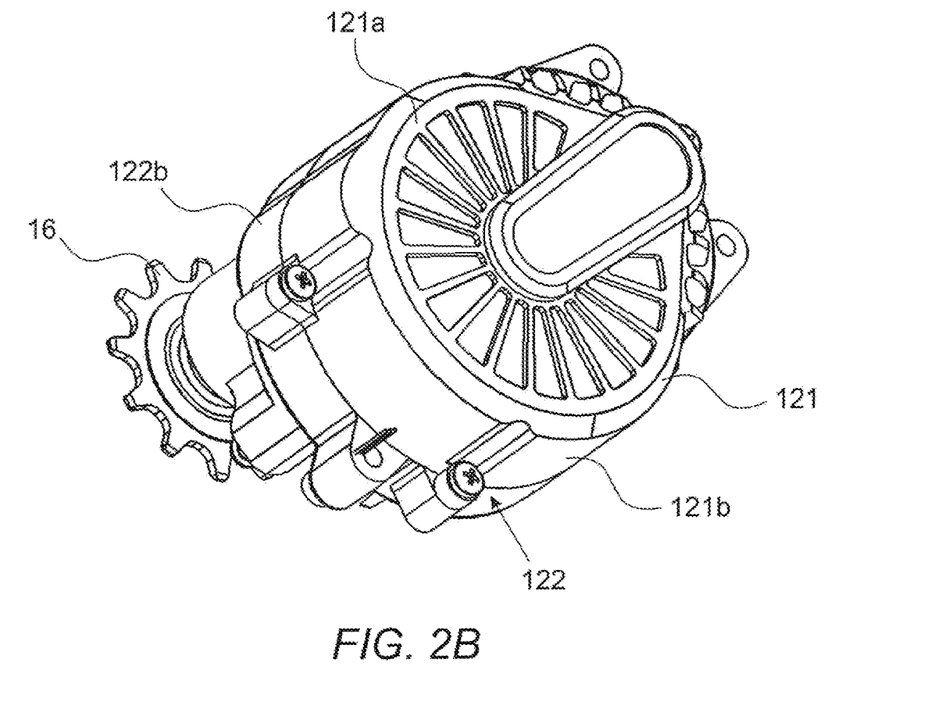
FIG. 2B is a schematic perspective view taken from the side opposite to that of FIG. 2A of the preferred embodiment of the apparatus according to the present invention.
Figure 2C:
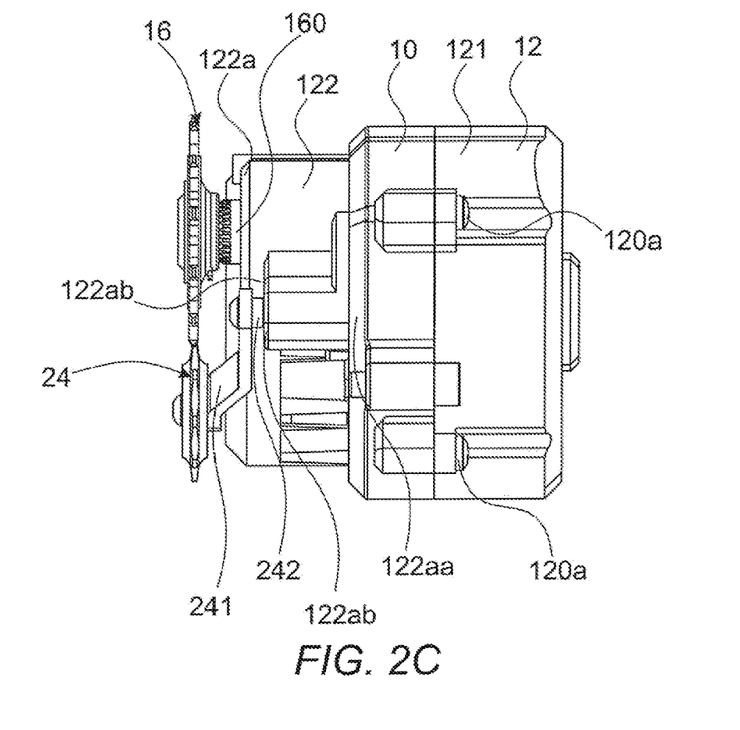
FIG. 2C shows a schematic, raised side view of the preferred embodiment of the apparatus according to the present invention.
Figure 2D:
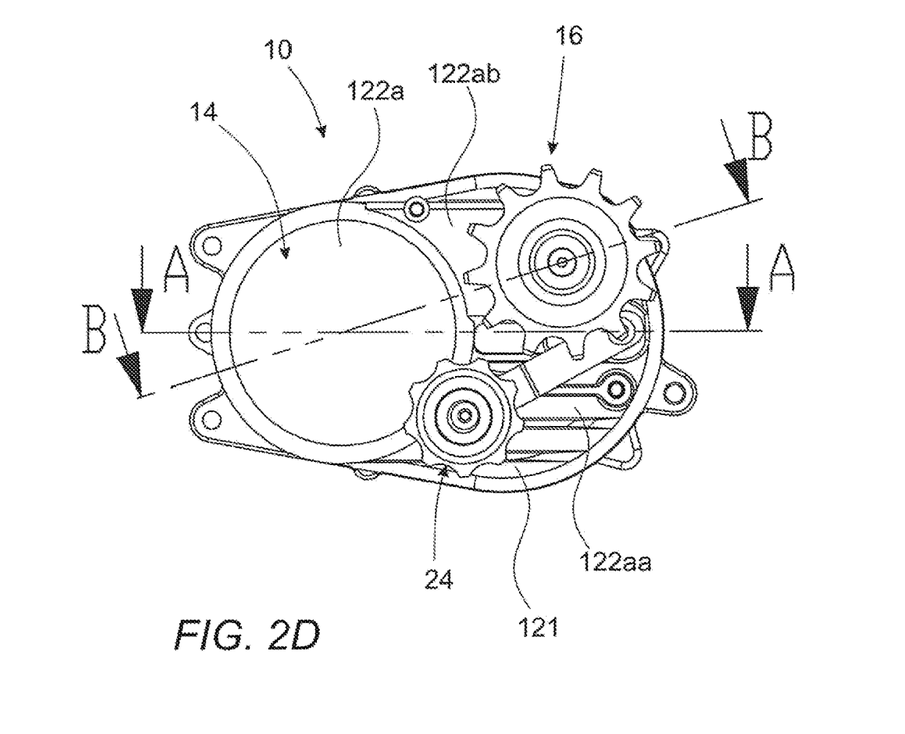
FIG. 2D shows a schematic, raised front view of the preferred embodiment of the apparatus according to the present invention.
Figure 2E:
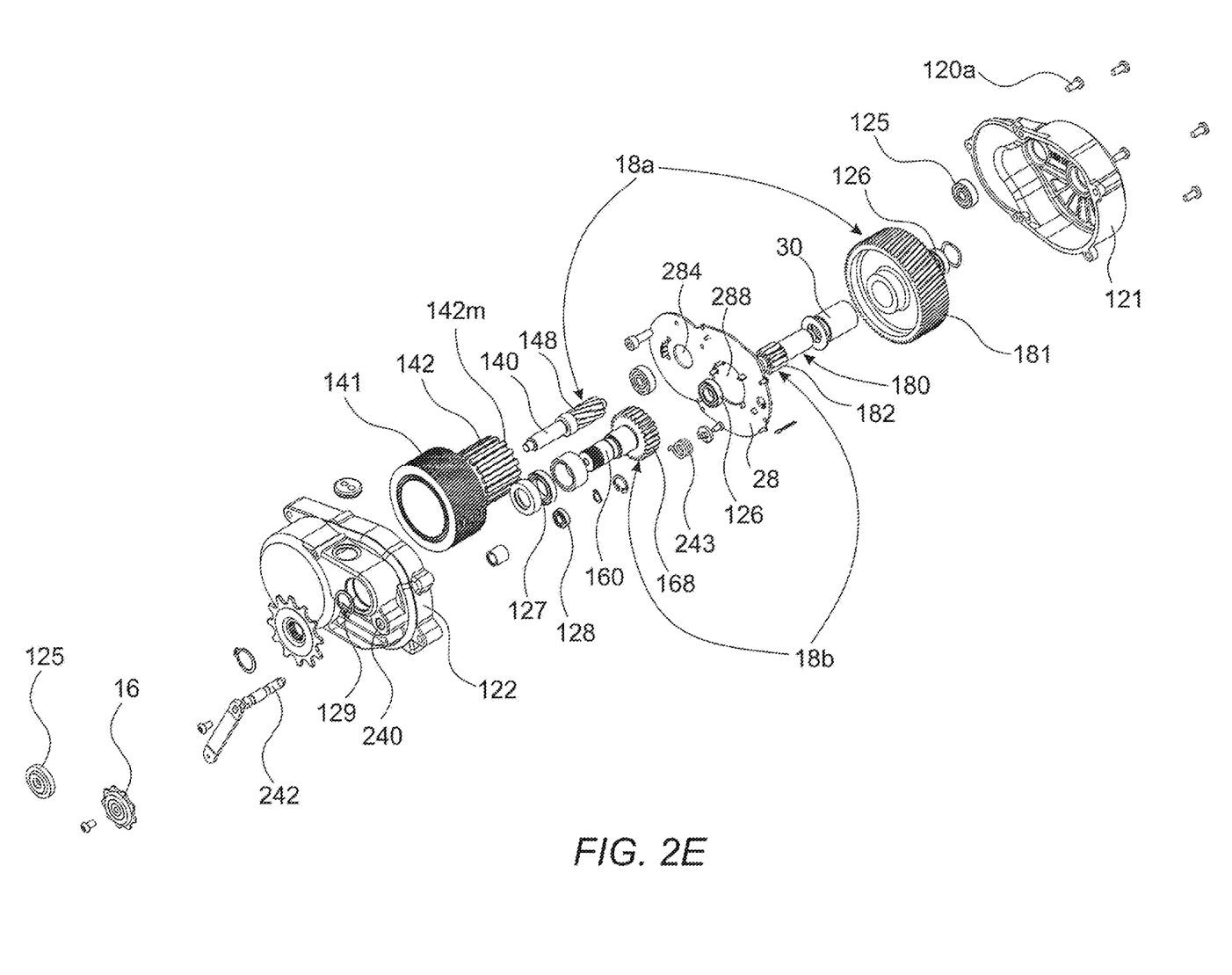
FIG. 2E shows an exploded perspective schematic view of the preferred embodiment of the apparatus according to the present invention.
Figure 3A:
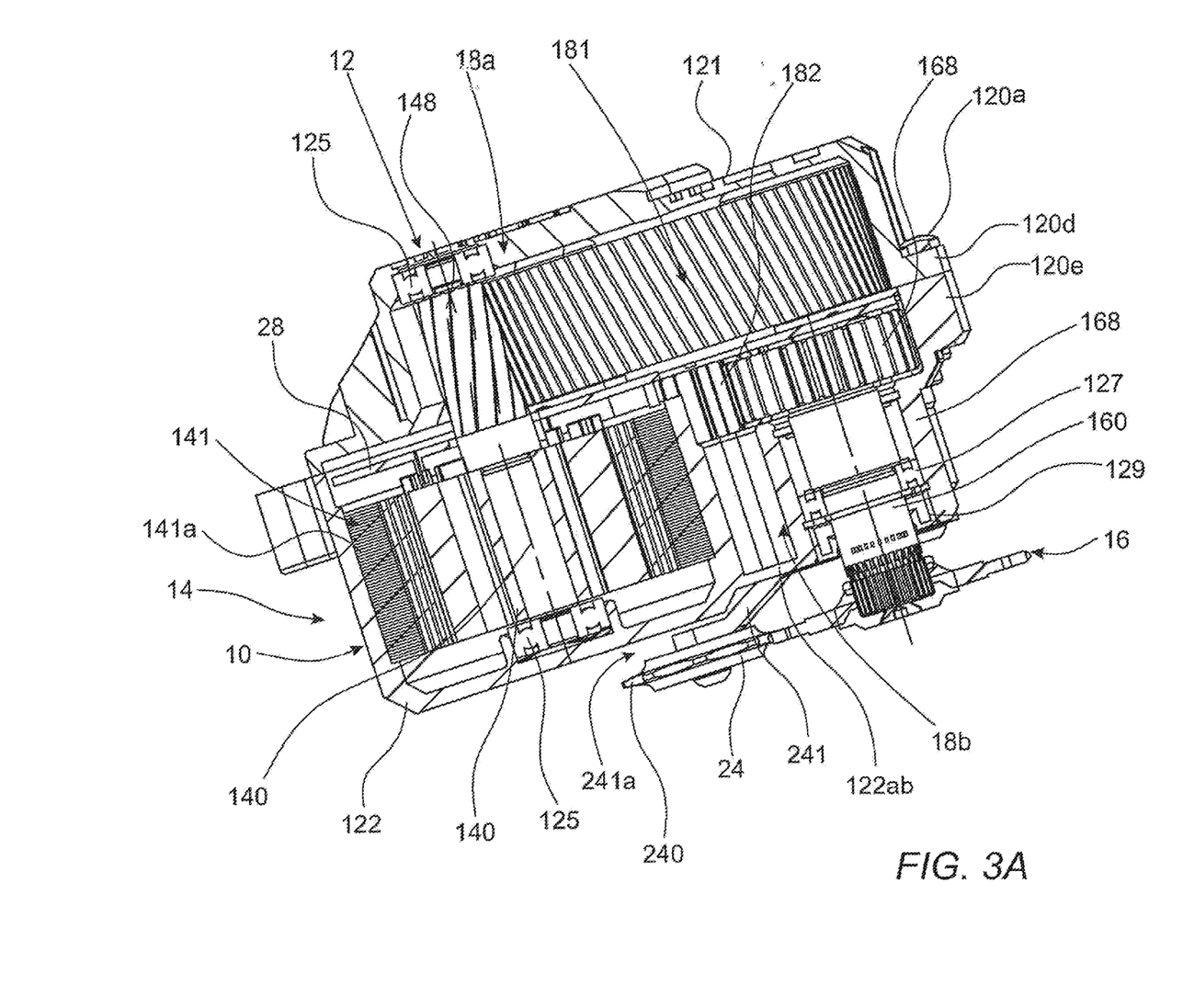
FIG. 3A shows a schematic sectional view, taken along the line B-B of FIG. 2D, of the preferred embodiment of the apparatus according to the present invention.
Figure 3B:
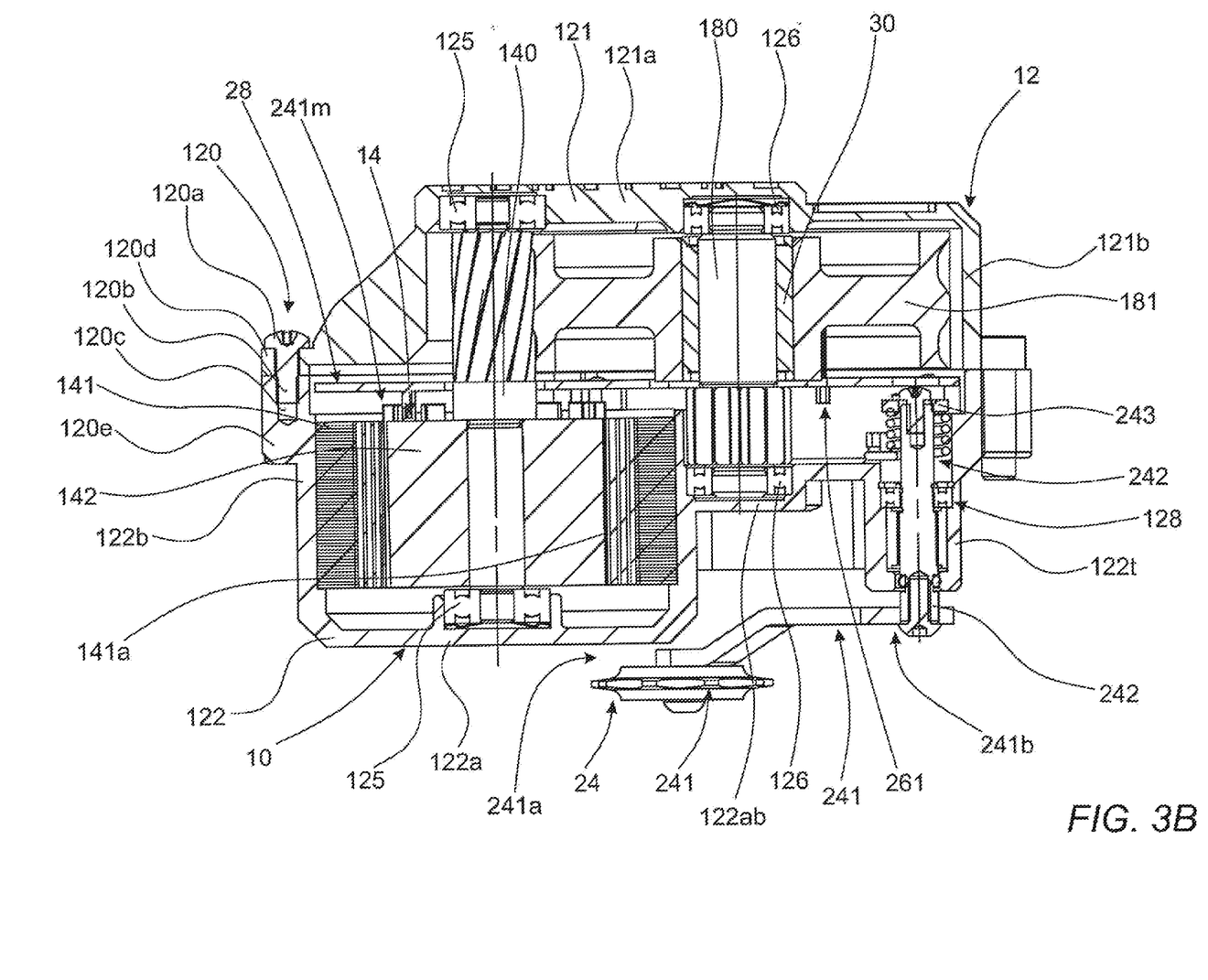
FIG. 3B shows a schematic sectional view, taken along the line A-A of FIG. 2D, of the preferred embodiment of the apparatus according to the present invention.
Figure 4:
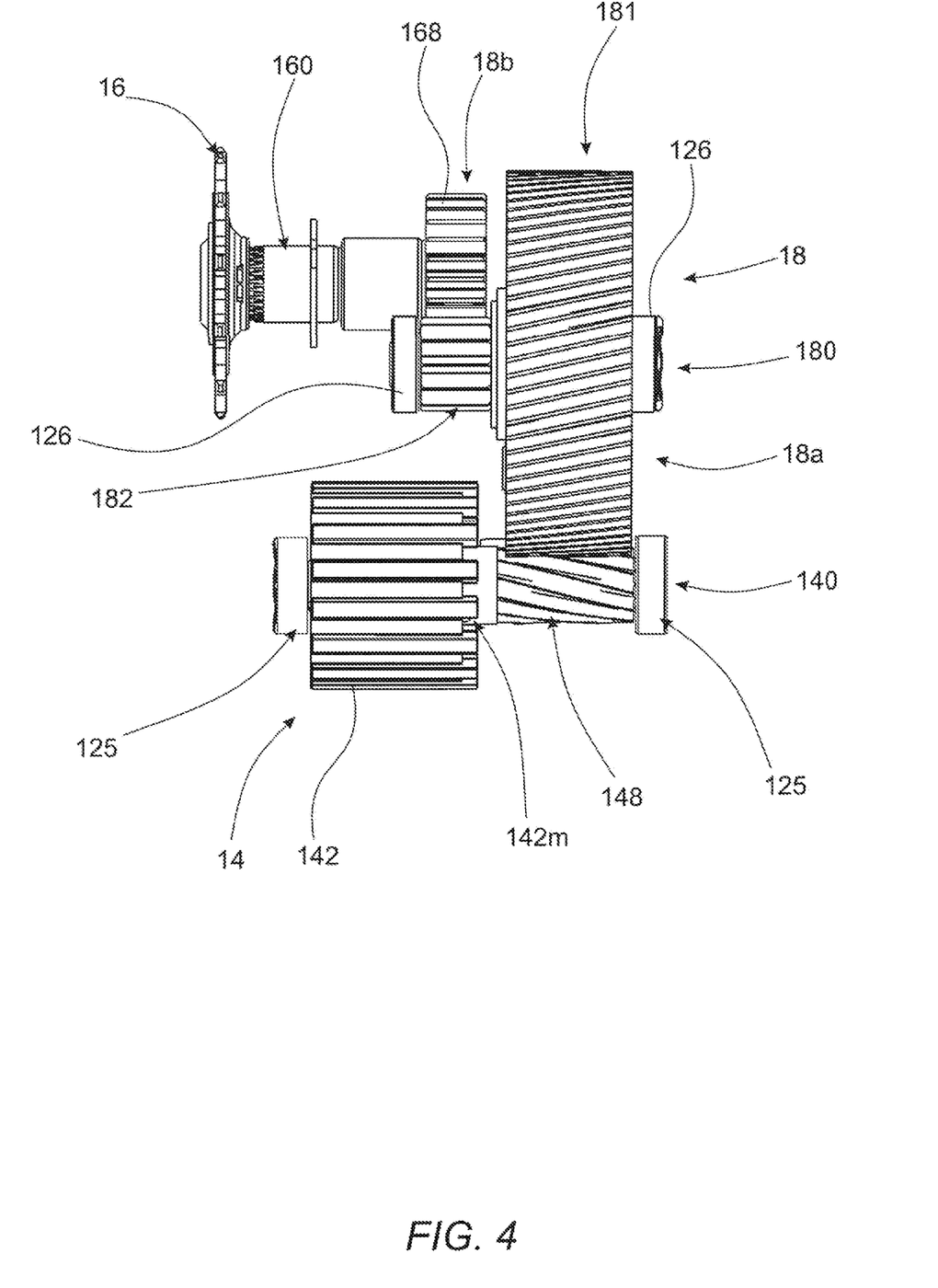
FIG. 4 shows a schematic plan view from above of only the internal part of the preferred embodiment of the apparatus according to the present invention.
Figure 5A:
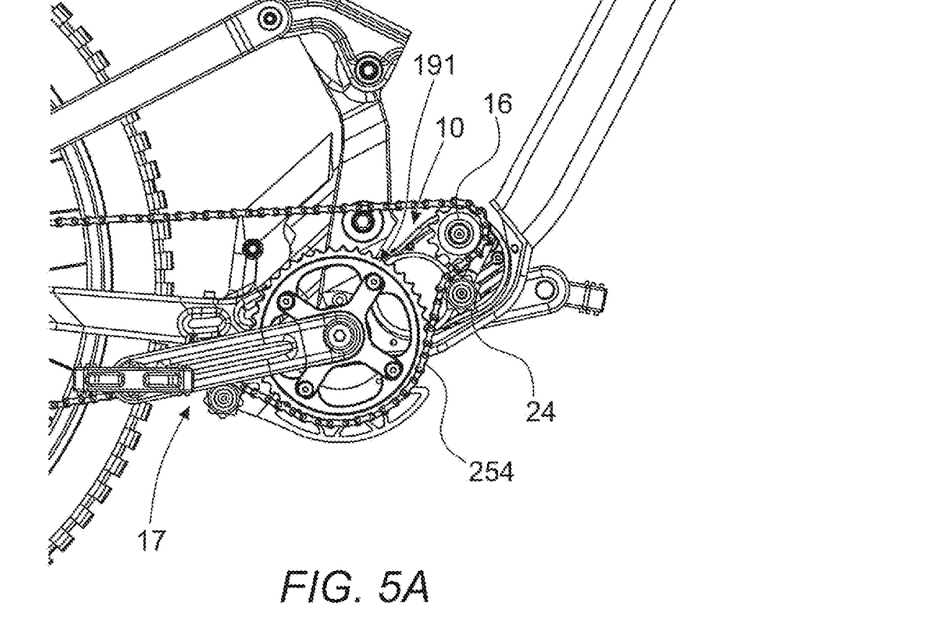
FIGS. 5A and 5B show respective schematic views of a detail of the vehicle with the preferred embodiment of the apparatus according to the present invention mounted, with reference to two different pedalling effort situations by the user.
Figure 5B:
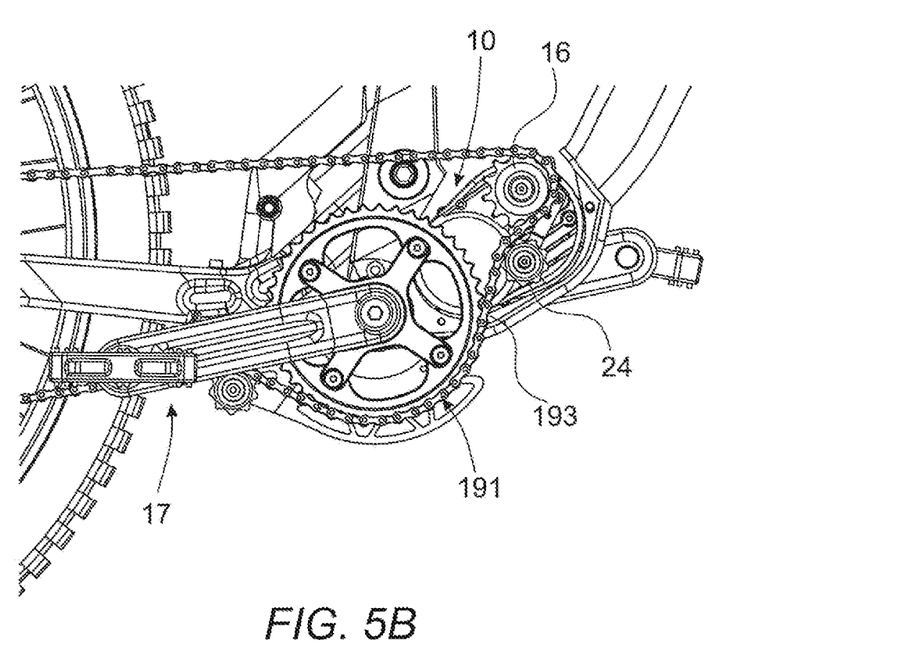
Figure 6:
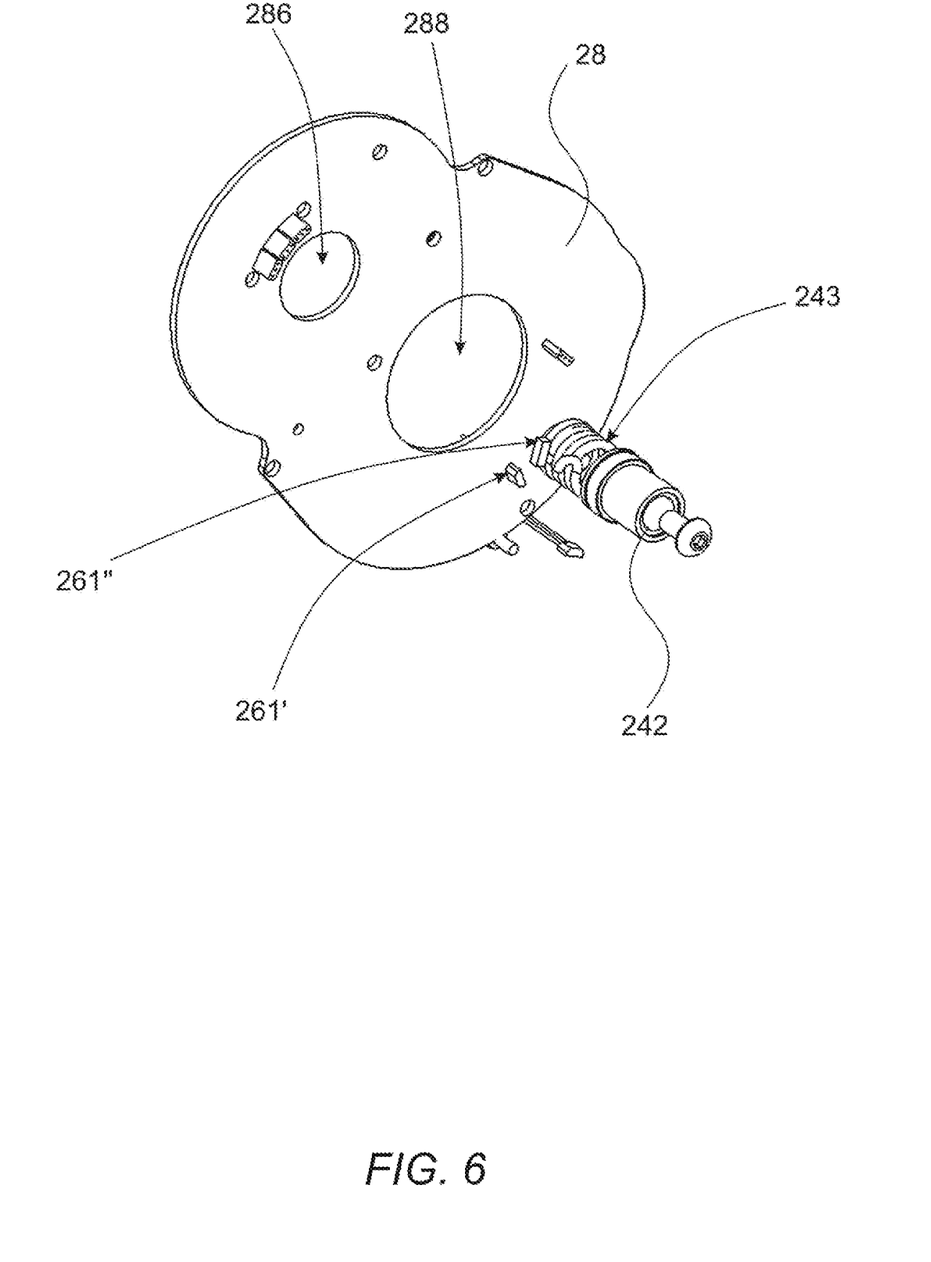
FIG. 6 shows a schematic perspective view of only the control board of the preferred embodiment of the apparatus according to the present invention.

Advantageously, as can be seen in particular in FIG. 2E, said means, or board, 28 for controlling said electric propulsion apparatus 10, in particular said electric actuation means, or motor, 14 comprise a respective internal hole 284 for the passage, through the same board 28, of said transversal rotatable shaft 140 of the same electric actuation means, or motor, 14.

Advantageously, as can be seen in particular in FIG. 2E, said means, or board, 28 for controlling said electric propulsion apparatus 10, in particular said electric actuation means, or motor, 14 comprise a respective internal hole 288 for the passage, through the same board 28.

Advantageously, as can be seen in the figures, the support body 12 comprises a first shell-like member 121 and a second shell-like member 122, in particular in the shape of a basin, opposite to one another and housing corresponding operative means of the same apparatus 10, i.e., said electric actuation means, or motor, 14 and/or said means 18 for transferring the power generated by said electric actuation means 14 to said means 16 for outputting the power generated by the electric propulsion apparatus 10, and/or part of the support means, and the respective small actuation wheel 168, of said means, or small wheel, 16 for outputting the power generated by the electric propulsion apparatus 10, and/or part of the support means of said means, or small wheel, 24 that are adapted to engage and to keep transmission means of the vehicle 11 tensioned.

Advantageously, as can be seen in the figures, the corresponding shell-like member, in particular the second shell-like member 122, comprises an opening 129 for the exit to the outside for said transversal rotatable shaft 160 of said means, or pinion, 16 for outputting the power generated by the electric propulsion apparatus 10.

Advantageously, as can be seen in the figures, the corresponding shell-like member, in particular the second shell-like member 122, comprises an opening 240 for the exit to the outside for said small supporting shaft 242 of said supporting arm 241 which carries said means, or small wheel, 24 which are adapted to engage and to keep said vehicle transmission means tensioned, i.e., said elongated and closed-loop member, or articulated link chain, 193 of the vehicle 11.

Advantageously, as can be seen in the figures, connection means 120 are provided between said first shell-like member 121 and second shell-like member 122 facing each other.

Advantageously, as can be seen in the figures, said connection means 120 between said first shell-like member 121 and second shell-like member 122 facing each other comprise corresponding screw means, or screws, 120a inserting into corresponding holes 120b, 120c provided in corresponding protruding portions 120d, 120e of said first shell-like member 121 and said second shell-like member 122 of the support body 12 facing each other.

Advantageously, as can be seen in the figures, said first shell-like member 121 of the support body 12 of the apparatus 10 comprises a bottom wall 121a, from which a lateral wall 121b extends peripherally, having a respective end lip which engages against an extreme lip of the lateral peripheral wall 122b of said second shell-like member 122 of the same support body 12, which, in turn, extends from the bottom wall 122a of the same second shell-like member 122 of said supporting body 12 of the apparatus 10.

Advantageously, as can be seen in the figures, said support body 12 has corresponding housing means for respective rotatable support means, in particular in the form of corresponding bearings, for corresponding rotatable members or shafts of the same apparatus 10.

Advantageously, as can be seen in the figures, rotatable support means, in particular in the form of corresponding bearings 125, 125, are provided in opposite seats, of said first shell-like member 121 and said second shell-like member 122 of the support body 12, for rotatably supporting said transversal rotatable shaft 140 of the same electric actuation means, or motor, 14.

Advantageously, as can be seen in the figures, rotatable support means, in particular in the form of corresponding bearings 126, 126, are provided in opposite seats of said first shell-like member 121 and said second shell-like member 122 of the support body 12, in particular at the bottom wall 121a of said first shell-like member 121 of said support body 12 and at a recessed portion 122aa of the same bottom wall 122a of said second shell-like member 122 of said support body 12, to rotatably support said intermediate transversal shaft 180, of said means 18 for transferring the power generated by said electric actuation means 14 to said means 16 for outputting the power generated by the electric propulsion apparatus 10.

Advantageously, as can be seen in the figures, rotatable support means, in particular in the form of a corresponding bearing 127, adapted to support said transversal rotatable shaft 160 of said means, or pinion, 16 for outputting the power generated by the propulsion apparatus 10, are provided in a seat at a lowered portion 122ab of the same bottom wall 122a of said second shell-like member 122 of said support body 12, which intermediate lowered portion 122ab of the same bottom wall 122a is perpendicularly at a level between the maximum perpendicular projection of said bottom wall 122a and said recessed portion 122aa of the same bottom wall 122a.

Advantageously, as can be seen in the figures, the rotating support means, in particular in the form of a corresponding bearing 128, are provided in a seat defined by a tubular portion 122t, protruding from said recessed portion 122aa of the same bottom wall 122a, to rotatably support said shaft 242 for supporting the chain tensioning means.

Advantageously, as can be seen in the figures, means are provided for securing said apparatus 10 to the vehicle, in particular to said support frame 13 of the vehicle 11, preferably at the convergence zone of the seat member, or tube, 131 and of the down member or tube 132 of the same support frame 13, or at the transverse tube or box 133 for supporting said human-powered means, or pedals 17 of the vehicle.

Advantageously, as can be seen in the figures, said means, or small wheel, 16 for outputting the power generated by the electric propulsion apparatus 10 and said means, or wheel, 24 which are adapted to engage and to keep said transmission means of the vehicle tensioned, or said elongated and closed-loop member, or articulated link chain, 193 of the vehicle 11, are coplanar with each other and, preferably, are arranged parallel and/or transversely spaced from the rear or external wall 122a of the corresponding shell-like member 122 of said support body 12 of the apparatus 10.

As illustrated, in use, preferably, said means, or small wheel, 16 for outputting the power generated by the electric propulsion apparatus 10 and said means, or wheel, 24 which are adapted to engage and to keep said transmission means of the vehicle tensioned, or said elongated and closed-loop member, or articulated link chain, 193 of the vehicle 11, are also coplanar to the wheel transmission means, in particular the toothed wheel, 191 of said human-powered means for forwarding and in particular positioned thereabove.

Advantageously, as can be seen in the figures, said electric actuation means, or motor, 14 and/or said second speed reducer stage 18b and/or said small shaft 242 for supporting said means, or small wheel, 24 which are adapted to engage and to keep said vehicle transmission means tensioned, or with the articulated connection link chain 250, are housed in said first shell-like member 121 of said support body 12.

Advantageously, as can be seen in the figures, said first 18a speed reducer stage, i.e., said small actuation wheel, in particular toothed, 148 mounted on the respective rotatable shaft 140 of the same actuation means, or motor, 14 and said small wheel, in particular toothed, 181 actuated by said electric actuation means, or motor, 14 is housed in said first shell-like member 121 of said support body 12.

Advantageously, as can be seen in the figures, said control means, or board 28, of said apparatus 10, in particular of said electric actuation means, or motor, 14 are housed in said second shell-like member 122 of said support body 12 of the apparatus 10, near the connection edge to said first shell-like member 121 of said support body 12.

In practice, as is evident, the technical characteristics illustrated above allow, individually or in a respective combination, achieving one or more of the following advantageous results:

it is possible to obtain a gearmotor unit for electric vehicles which is very compact, light, simple and low cost to produce, capable of providing high performance of the vehicle in terms of torque and power it is possible to use components for said means for transferring the power generated by said electrical actuation means to said means for outputting the power generated by the propulsion apparatus, i.e., corresponding small transmission wheels, which can be of not excessively large size or diameter and it is thus possible to reduce the corresponding length of the propulsion apparatus and consequently the corresponding dimension of the support body with an overall reduction of the weight of the same apparatus;

it is possible to achieve powers output from the same transferring means which are suitably high, even with motors with lower dimensions, with a further advantage for the weight of the propulsion apparatus;

it is possible to manufacture a particularly compact electric propulsion apparatus with advantageously flexible positioning on corresponding vehicles or bicycles;

it is possible to obtain a particularly direct measurement of the muscular effort made by the user of the vehicle, and consequently to control the electric propulsion apparatus in a more appropriate way.

The present invention is susceptible to evident industrial application. The person skilled in the art will also be able to imagine numerous modifications and/or variations to be made to the same invention, while remaining within the scope of the inventive concept, as extensively explained. Moreover, the person skilled in the art will be able to imagine further preferred embodiments of the invention which include one or more of the above illustrated characteristics of the preferred embodiment. Moreover, it must also be understood that all the details of the invention can be replaced by technically equivalent elements.

The invention claimed is:

1. An apparatus for electric propulsion of a human-powered vehicle in the form of a bicycle, comprising:
    a support body,
    an electric propulsion device for forwarding actuation of the vehicle, in the form of a brushless electric motor having a rotatable shaft for outputting power generated by the brushless electric motor,
    an output device for outputting the power generated by the brushless electric motor, said output device being in the form of a corresponding toothed small wheel, the toothed small wheel not being coaxial to a human powered toothed wheel for the forwarding actuation of the vehicle,
    a transfer device for transferring the power generated by said brushless electric motor to said output device, said transfer device comprising a first speed reducer stage and a second speed reducer stage,
    wherein said toothed small wheel is actuated, in rotation, by a corresponding toothed small actuation wheel, coaxially supported, or mounted at an opposite end of a first transversal shaft for supporting said toothed small wheel.

2. The apparatus according to claim 1, wherein said toothed small actuation wheel, or said toothed small wheel is positioned at an intermediate transversal zone of the support body.

3. The apparatus according to claim 1, wherein said transfer device comprises a first toothed wheel engaging, or meshing, a second toothed wheel rotatable shaft of the brushless electric motor.

4. The apparatus according to claim 3, wherein said first toothed wheel and said second toothed wheel define together said first speed reducer stage.

5. The apparatus according to claim 1, wherein said transfer device comprises a third toothed wheel that engages, or meshes, a fourth toothed wheel mounted on said first transversal shaft.

6. The apparatus according to claim 5, wherein said first toothed wheel and said third toothed wheel are mounted on a second transversal shaft to be operatively connected and integral in rotation with each other.

7. The apparatus according to claim 6, wherein said second transversal shaft is perpendicularly arranged at a height level that is lower than said first transversal shaft and/or of said rotatable shaft of the brushless electric motor.

8. The apparatus according to claim 5, wherein said third toothed wheel and said fourth toothed wheel define together said second speed reducer stage of the electric propulsion apparatus.

9. The apparatus according to claim 1, wherein the first transversal shaft is perpendicularly arranged at a height level that is lower than said rotatable shaft of the brushless electric motor.

10. The apparatus according to claim 1, and further comprising a free wheel device configured to transmit power only to forward the vehicle.

11. The apparatus according to claim 1, and further comprising:
    an elongated and closed loop chain connecting the toothed small wheel with the human powered toothed wheel, and
    a tensioner adapted to engage and to keep said chain tensioned.

12. The apparatus according to claim 11, wherein said tensioner comprises a tensioner toothed wheel engaging the chain.

13. The apparatus according to claim 11, wherein said tensioner includes a support arm having a first end rotatably supported on the support body, the tensioner toothed wheel being freely rotatably mounted on a free second end of the support arm.

14. The apparatus according to claim 13, and further comprising a support shaft rotatably mounted to the support body and on which the first end of the support arm is supported, rotatable with respect to the support body.

15. The apparatus according to claim 14, and further comprising a spring operatively connected with the tensioner to keep the tensioner toothed wheel engaged with the chain.

16. The apparatus according to claim 15, wherein said spring is wound around the support shaft.

17. The apparatus according to claim 14, and further comprising an intensity detector for detecting an intensity of propulsion that is imparted by a user to a pedal, for forwarding the human-powered vehicle.

18. The apparatus according to claim 17, wherein said intensity detector comprises a detector for detecting an angular position of the support shaft.

19. The apparatus according to claim 18, wherein said detector for detecting the angular position of said support shaft includes a Hall effect sensor, which detects a position of a corresponding permanent magnet secured to said support.

20. The apparatus according to claim 1, and further comprising a controller for controlling said brushless electric motor, the controller being said electric propulsion apparatus housed inside said support body, arranged between said first and second speed reducer stages.

21. The apparatus according to claim 1, wherein the support body comprises a first shell member and a second shell member, each being basin shaped, being opposite to one another and housing said brushless electric motor, and/or said transfer device and/or part of the output device and/or part of a tensioner adapted to engage and to keep a chain connecting the toothed small wheel with the human powered toothed wheel tensioned.

22. A human-powered vehicle, in the form of a bicycle, comprising the apparatus according to claim 1.

23. An apparatus for electric propulsion of a human-powered vehicle in the form of a bicycle, comprising:
    a support body,
    an electric propulsion device for forwarding actuation of the vehicle, in the form of a brushless electric motor having a rotatable shaft for outputting power generated by the brushless electric motor,
    an output device for outputting the power generated by the brushless electric motor, said output device being in the form of a corresponding toothed small wheel, the toothed small wheel not being coaxial to a human powered toothed wheel for the forwarding actuation of the vehicle, and a transfer device for transferring the power generated by said brushless electric motor to said output device, said transfer device comprising a first speed reducer stage and a second speed reducer stage, wherein said transfer device comprises a third toothed wheel that engages, or meshes, a fourth toothed wheel mounted on said first transversal shaft.

24. An apparatus for electric propulsion of a human-powered vehicle in the form of a bicycle, comprising:

a support body, an electric propulsion device for forwarding actuation of the vehicle, in the form of a brushless electric motor having a rotatable shaft for outputting power generated by the brushless electric motor, an output device for outputting the power generated by the brushless electric motor, said output device being in the form of a corresponding toothed small wheel, the toothed small wheel not being coaxial to a human powered toothed wheel for the forwarding actuation of the vehicle, a transfer device for transferring the power generated by said brushless electric motor to said output device, said transfer device comprising a first speed reducer stage and a second speed reducer stage, and a free wheel device configured to transmit power only to forward the vehicle.

\* \* \* \* \*